(12) United States Patent
Hoke et al.

(10) Patent No.: US 11,300,773 B2
(45) Date of Patent: Apr. 12, 2022

(54) MID-INFRARED SCANNING SYSTEM

(71) Applicant: Agilent Technologies, Inc., Loveland, CO (US)

(72) Inventors: Charles Hoke, Menlo Park, CA (US); Varun Raghunathan, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 783 days.

(21) Appl. No.: 14/500,493

(22) Filed: Sep. 29, 2014

(65) Prior Publication Data
US 2016/0091704 A1  Mar. 31, 2016

(51) Int. Cl.
| | |
|---|---|
| G02B 21/36 | (2006.01) |
| G02B 21/00 | (2006.01) |
| G02B 21/08 | (2006.01) |
| H04N 5/33 | (2006.01) |
| G01N 21/359 | (2014.01) |
| G01N 21/39 | (2006.01) |
| G01N 21/35 | (2014.01) |
| G01N 21/3563 | (2014.01) |

(52) U.S. Cl.
CPC ........... *G02B 21/361* (2013.01); *G01N 21/35* (2013.01); *G01N 21/359* (2013.01); *G01N 21/3563* (2013.01); *G01N 21/39* (2013.01); *G02B 21/002* (2013.01); *G02B 21/08* (2013.01); *G02B 21/367* (2013.01); *H04N 5/33* (2013.01)

(58) Field of Classification Search
CPC .... G02B 21/002; G02B 21/08; G02B 21/361; G02B 21/367; G01N 21/39; G01N 21/35; G01N 21/3563; G01N 21/359; H04N 5/33

USPC .......................................................... 348/79
See application file for complete search history.

(56) References Cited

U.S. PATENT DOCUMENTS

| | | | |
|---|---|---|---|
| 5,233,197 A | 8/1993 | Bowman et al. | |
| 5,247,176 A | 9/1993 | Goldstein | |

(Continued)

FOREIGN PATENT DOCUMENTS

| | | |
|---|---|---|
| CN | 1818619 A | 8/2006 |
| CN | 102292629 A | 12/2011 |

(Continued)

OTHER PUBLICATIONS

European Search Report dated Mar. 8, 2016, EP Application No. 15186716.5-1554/3001179.

(Continued)

*Primary Examiner* — Matthew K Kwan

(57) ABSTRACT

An apparatus and method for generating a mid-infrared region image of a specimen are disclosed. The apparatus includes a mid-infrared region laser that generates a first light beam, and a stage adapted to carry a specimen to be scanned. An optical assembly focuses the first light beam to a point on the specimen. A first light detector measures a first intensity of light leaving the point on the specimen. A stage actuator assembly causes the specimen to move relative to the point in two dimensions. A controller forms a mid-infrared region image from the first intensity. The image can be based on reflected or transmitted light. The maximum size of the imaged area is determined by a scanning assembly that moves in a first direction relative to the stage, the stage moving in a direction orthogonal to the first direction.

11 Claims, 5 Drawing Sheets

(56) References Cited

U.S. PATENT DOCUMENTS

| | | | |
|---|---|---|---|
| 5,285,236 A | 2/1994 | Jain | |
| 5,329,350 A * | 7/1994 | Wright | G01J 1/04 |
| | | | 356/218 |
| 5,360,424 A * | 11/1994 | Klopotek | A61F 9/00802 |
| | | | 606/17 |
| 5,756,689 A | 5/1998 | Busman et al. | |
| 5,894,345 A | 4/1999 | Takamoto | |
| 6,043,506 A | 3/2000 | Heffelfinger et al. | |
| 6,310,345 B1 | 10/2001 | Pittman | |
| 6,618,145 B1 | 9/2003 | Goldstein | |
| 6,853,926 B2 | 2/2005 | Alfano et al. | |
| 7,038,208 B2 | 5/2006 | Alfano et al. | |
| 7,298,480 B2 | 11/2007 | Garcia-Caurel | |
| 7,298,492 B2 | 11/2007 | Tixier | |
| 9,279,770 B2 | 3/2016 | Mossoba | |
| 2001/0011704 A1 * | 8/2001 | Niwa | B82Y 20/00 |
| | | | 850/30 |
| 2002/0113210 A1 * | 8/2002 | Treado | G01J 3/2823 |
| | | | 250/331 |
| 2003/0229458 A1 | 12/2003 | Alfano | |
| 2004/0217290 A1 * | 11/2004 | Davis | G01N 21/3563 |
| | | | 250/341.8 |
| 2005/0046936 A1 | 3/2005 | Dixon | |
| 2005/0098728 A1 | 5/2005 | Alfano | |
| 2006/0086912 A1 | 4/2006 | Weir | |
| 2007/0078348 A1 * | 4/2007 | Holman | A61B 5/0075 |
| | | | 600/473 |
| 2007/0273865 A1 | 11/2007 | Niitsui | |
| 2008/0078348 A1 | 4/2008 | Lu | |
| 2008/0304047 A1 | 12/2008 | Lee | |
| 2009/0040513 A1 | 2/2009 | Abe et al. | |
| 2009/0057536 A1 * | 3/2009 | Hirose | G01J 1/04 |
| | | | 250/208.1 |
| 2009/0284184 A1 * | 11/2009 | Valois | H05B 37/0254 |
| | | | 315/312 |
| 2010/0051808 A1 | 3/2010 | Zeman | |
| 2010/0053588 A1 * | 3/2010 | Binnard | G03B 27/32 |
| | | | 355/77 |
| 2011/0208462 A1 * | 8/2011 | Maier | G01J 3/02 |
| | | | 702/104 |
| 2011/0273702 A1 | 11/2011 | Jones et al. | |
| 2011/0273767 A1 * | 11/2011 | Glaser | G02B 17/008 |
| | | | 359/374 |
| 2012/0019835 A1 | 1/2012 | Nakao | |
| 2013/0002839 A1 | 1/2013 | Pennisi | |
| 2013/0137961 A1 * | 5/2013 | Barnes | A61B 5/0062 |
| | | | 600/407 |
| 2015/0268226 A1 * | 9/2015 | Bhargava | G01N 33/5091 |
| | | | 514/789 |
| 2015/0276864 A1 | 10/2015 | Yurt | |
| 2016/0109630 A1 | 4/2016 | Ichihashi | |

FOREIGN PATENT DOCUMENTS

| | | |
|---|---|---|
| CN | 102893121 A | 1/2013 |
| CN | 103534581 A | 1/2014 |
| CN | 103558221 A | 2/2014 |
| CN | 203561585 U | 4/2014 |
| CN | 103890633 A | 6/2014 |
| EP | 1111426 A2 | 6/2001 |
| WO | 2013/126999 A1 | 9/2013 |

OTHER PUBLICATIONS

Cohn, Keith Ryan, Multiphoton Imaging with Vibrational Contrast and High Spatial Resolution, A Dissertation Submitted to the Department of Physics and the Committee on Graduate Studies of Stanford University in Partial Fulfillment of the Requirements for the Degree of Doctor of Philosophy, Dec. 2006, ProQuest Information and Learning Company, Ann Arbor, MI.

Ali, Jamal Hafiez, Light Propagation in Paint and Prostate Human Tissues Using Visible to Mid-IR Spectroscopy and Imaging Techniques, A dissertation submitted to the Graduate Faculty in Physics in partial fulfillment of the requirements for the degree of Doctor of Phiiosphy, The City University of New York, 2004, ProQuest Information and Learning Company, Ann Arbor, MI.

Han et al., Time-domain Transillumination fo Biological Tissues with Terahertz Pulses, Optics Letters, Feb. 15, 2000, vol. 25, No. 4.

Notice of Allowance dated Sep. 13, 2016, U.S. Appl. No. 14/683,841.

European Search Report dated Jul. 25, 2016, EP Application No. 15186716.5.

EP Office Action dated Dec. 1, 2017, Aopplication No. 15186716.5.

* cited by examiner

MID-INFRARED SCANNING SYSTEM

BACKGROUND

Quantum cascade lasers provide a tunable mid-infrared (MIR) light source that can be used for spectroscopic measurements and images. Many chemical components of interest have molecular vibrations that are excited in the mid-IR region of the optical spectrum, which spans wavelengths between 5 to 25 microns. Hence, measuring the absorption of MIR light at various locations on a sample can provide useful information about the chemistry of the sample.

SUMMARY

The present invention includes an apparatus for generating a MIR image of a specimen and a method for imaging a specimen in the MIR. In one embodiment, the apparatus includes a MIR imaging system having a MIR laser that generates a first light beam, and a stage adapted to carry a specimen to be scanned. An optical assembly focuses the first light beam to a point on the specimen, and a first light detector measures a first intensity of light leaving the point on the specimen. A stage actuator assembly causes the specimen to move relative to the point in two dimensions. A controller forms a MIR image from the first intensity. The optical assembly includes a scanning assembly having a focusing lens that focuses the first light beam to the point and a mirror that moves in a first direction relative to the stage such that the focusing lens maintains a fixed distance between the focusing lens and the stage, the stage moving in a direction orthogonal to the first direction.

In one aspect of the invention, the first light detector measures light reflected from the specimen. In another aspect of the invention, the first light detector measures light transmitted by the specimen.

In a still further aspect of the invention, a beam intensity detector measures an intensity of the first light beam. In embodiments in which the MIR laser is a pulsed light source, the controller sums measured intensities from the reflected light detector only during periods in which the measured beam intensity is greater than a first threshold. In one aspect of the invention, the controller determines a ratio of the measured intensity of the first light beam and the measured beam intensity to form the MIR image.

In another aspect of the invention, the apparatus includes a visible light imaging station that displays an image of the specimen generated by illuminating the specimen with light in a visual range of light wavelengths. The controller is configured to receive input from a user indicating a region in the visible image that is to be scanned by the MIR imaging system to generate a corresponding MIR image.

In a still further aspect of the invention, the MIR laser generates light in a range of wavelengths that is controlled by the controller; the controller is configured to receive input from a user indicating a feature of interest in the MIR image, and the controller measures light leaving the features at different wavelengths from the feature of interest to generate a spectrum characterizing the feature of interest.

In another embodiment of the invention, the MIR imaging system includes a pulsed MIR laser that generates a first light beam, and a stage adapted to carry a specimen to be scanned. An optical assembly focuses the first light beam to a point on the specimen, and a first light detector measures a first intensity of light leaving the point on the specimen. The stage actuator assembly causes the specimen to move relative to the point in two dimensions and a beam intensity detector measures an intensity of the first light beam. A controller forms a MIR image from the first intensity. The controller sums measured intensities from the reflected light detector only during periods in which the measured beam intensity is greater than a first threshold.

In one aspect of the invention, the controller determines a ratio of the measured intensity of the first light beam and the measured beam intensity to form the MIR image. In another aspect of the invention, the controller only sums measured intensities associated with pulses that generate an intensity greater than a predetermined threshold in the beam intensity detector.

In a still further aspect of the invention, the beam intensity detector includes a directional attenuator that blocks light not traveling in a predetermined direction.

DETAILED DESCRIPTION

One type of system for generating images in the MIR can be viewed as a conventional microscope with a MIR light source and an optical system that images the illuminated sample onto an array of MIR detectors. A MIR light source based on a quantum cascade laser provides a tunable MIR light source. There are several problems with such imaging systems.

First, the laser light is spread over the entire field being imaged, which leads to a low local illumination intensity at each point on the specimen. In systems in which the quantum cascade laser is pulsed, the average duty cycle of the light source is small, and a large number of pulses must be integrated on the imaging array. The imaging array cannot be turned on and off in synchrony with the pulses. Hence, during the periods between pulses, the imaging array accumulates noise which lowers the signal-to-noise ratio. To overcome the noise, longer exposure times are required, which increases the time to form an image. In some applications, imaging time is crucial, as the sample is changing chemically or spatially over a time span that is small compared to the image acquisition time in such systems.

Second, if the desired image has many more pixels than the size of the imaging array, a plurality of sub-images must be "stitched" together to form the final image. This process adds artifacts to the final image and further increases the time needed to generate an image.

Third, interference artifacts detract from the images. The light from a quantum cascade laser is coherent. As a result, light that is reflected from adjacent areas on the sample interferes, which leads to speckling in the image that obscures details of interest.

Fourth, zooming in or out to change the resolution of the image requires a plurality of MIR imaging objective lenses. To avoid stitching several images together, the field of view of the microscope can be increased by changing the magnification of the MIR imaging optics. This requires that different objective lenses be utilized. The additional objective lenses and the need to calibrate the imaging array for each objective lens increases the cost and complexity of the system.

Figure 1:
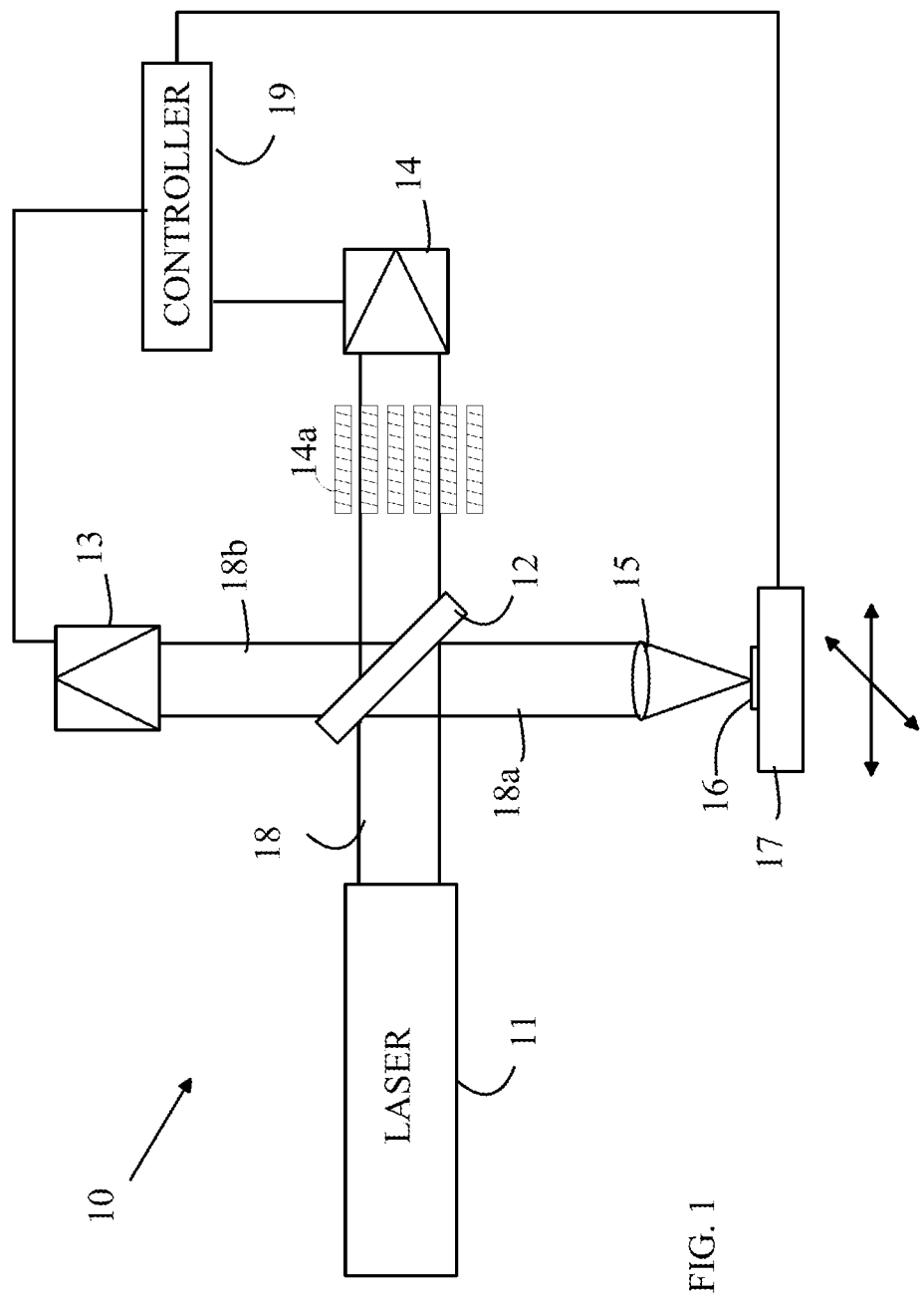
FIG. 1 illustrates a MIR imaging system according to one embodiment of the present invention.

The manner in which various embodiments of the present invention provide advantages can be more easily understood with reference to FIG. 1, which illustrates a MIR imaging system according to one embodiment of the present invention. Imaging system 10 includes a quantum cascade laser 11 that generates a collimated light beam 18 having a narrow band of wavelengths in the MIR. In one aspect of the invention, laser 11 is a quantum cascade laser having a tunable wavelength that is under the control of a controller 19. Collimated light beam 18 is split into two beams by a partially reflecting mirror 12. Light beam 18a is directed to a lens 15 that focuses that beam onto a specimen 16 that is mounted on xy-stage 17 that can position specimen 16 relative to the focal point of lens 15. Light that is reflected back from specimen 16 is collimated into a second beam that has a diameter determined by the aperture of lens 15 and returns to partially reflecting mirror 12 along the same path as light beam 18a. While the first and second beams are shown as having the same cross-section in FIG. 1, it is to be understood that the second beam could have a different cross-section than the first beam. A portion of the second beam is transmitted through partially reflecting mirror 12 and impinges on a first light detector 13 as shown at 18b. Detector 13 generates a signal related to the intensity of light in beam 18b. Controller 19 computes an image as a function of position on specimen 16 by moving specimen 16 relative to the focal point of lens 15 using xy-stage 17.

In one aspect of the invention, controller 19 also monitors the beam intensity of the light in collimated light beam 18 using a second light detector 14 that receives a portion of the light generated by quantum cascade laser 11 through partially reflecting mirror 12. Quantum cascade laser 11 is typically a pulsed source. The intensity of light from pulse to pulse can vary significantly, and hence, the pixels of the image are corrected for the variation in intensity by dividing the intensity measured by detector 13 by the intensity measured by detector 14. In addition, since the light intensity from quantum cascade laser 11 is zero between pulses, controller 19 only sums the ratio of intensities from detectors 13 and 14 during those times at which the output of detector 14 is greater than some predetermined threshold. This aspect of the present invention improves the signal-to-noise ratio of the resultant image, since measurements between pulses contribute only noise, which is removed by not using measurements between pulses.

As noted above, when a coherent light source is used to illuminate the entire specimen, interference between light reflected from different portions of the specimen leads to image artifacts that result from the interference of the coherent light leaving different parts of the specimen. If two points that are illuminated are sufficiently close that light from each point is received at the detector, the light from the two points is coherently combined leading to intensity variations that cannot be easily distinguished from variations in the reflected light intensities. Hence, when the entire area of interest on the specimen is illuminated, light that is reflected from adjacent regions on the specimen can reach the same pixel on the imaging array, leading to interference artifacts. The present invention avoids such artifacts by using an illumination system in which light from only one point on the specimen is received by detector 13.

Figure 2:
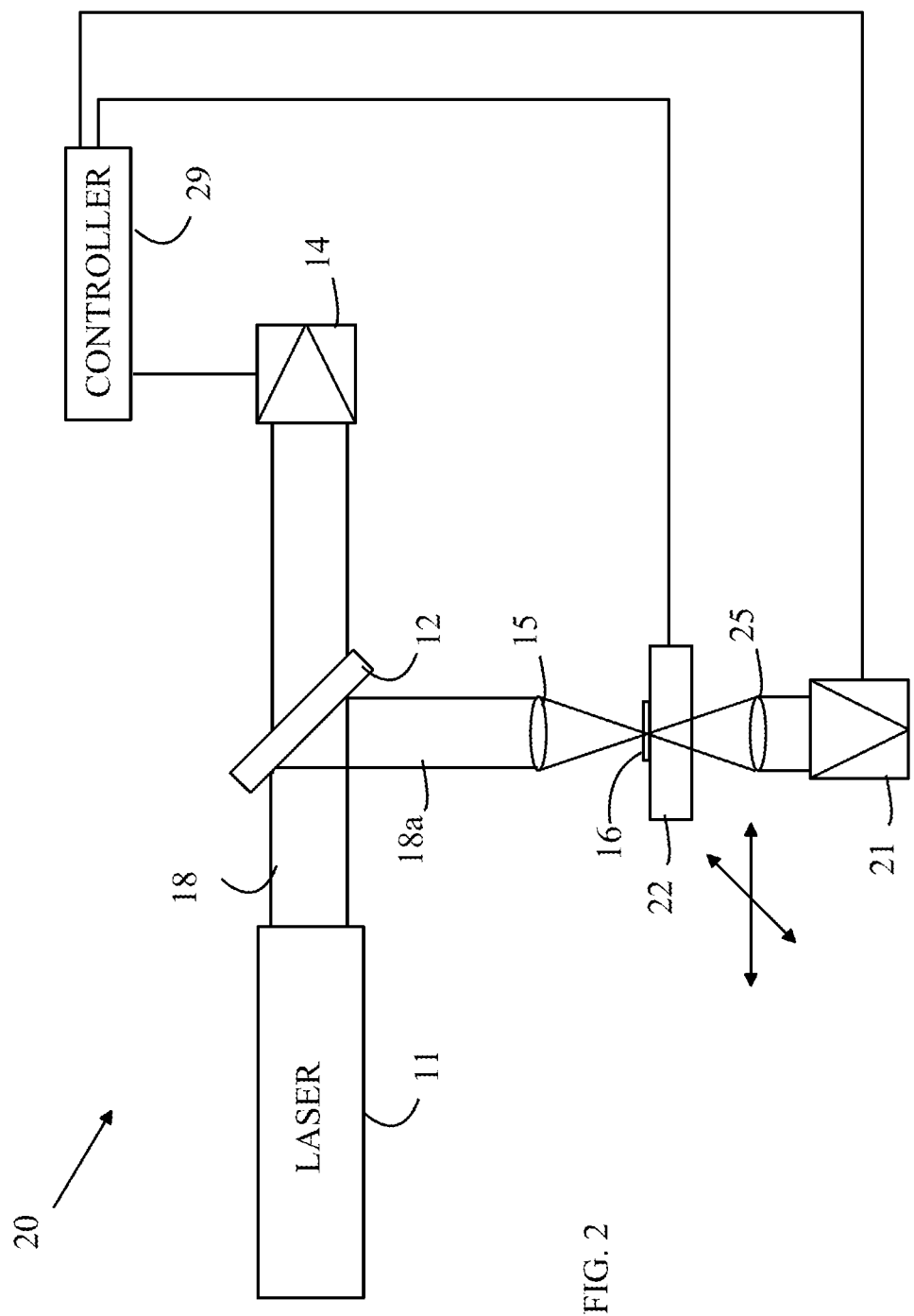
FIG. 2 illustrates another embodiment of an imaging system according to the present invention.

The above described embodiments measure the intensity of light reflected from the specimen. However, embodiments in which the light that is transmitted by the specimen can also be constructed. Refer now to FIG. 2, which illustrates another embodiment of an imaging system according to the present invention. Imaging system 20 generates an image based on the light that is transmitted by the specimen. To simplify the following discussion, those elements of imaging system 20 that serve the same functions of corresponding elements in FIG. 1 have been given the same numeric designations and will not be discussed further here. Stage 22 is transparent to light in the MIR. Light that is transmitted by specimen 16 is collected by lens 25 and directed to detector 21 which measures the intensity of the light. Controller 29 generates the transmission image in a manner analogous to that described above with reference to controller 19.

Figure 3:
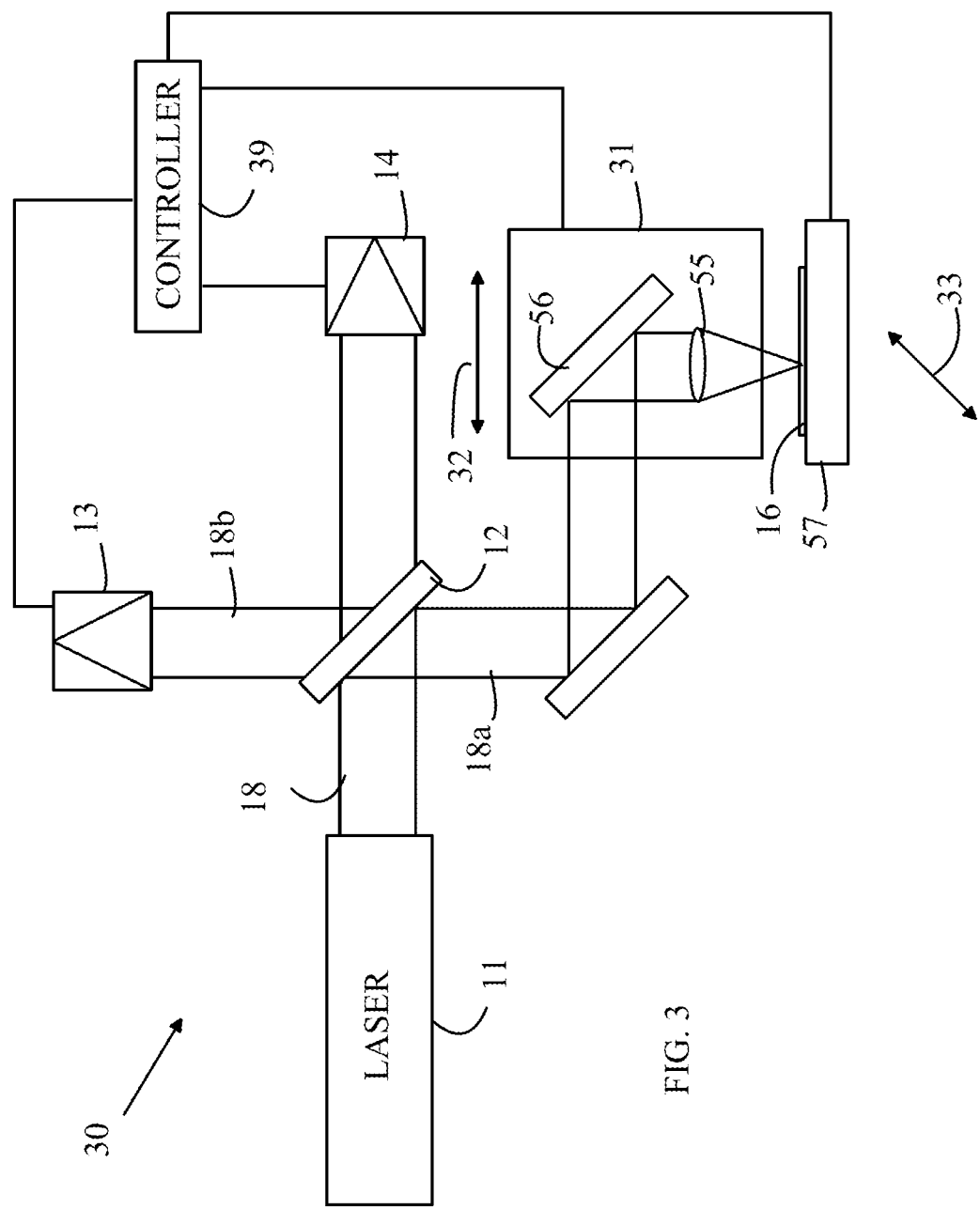
FIG. 3 illustrates another embodiment of an imaging system according to the present invention.

In the above described embodiments, the stage moves the sample in two dimensions. However, the stage has a significant mass, and hence, the speed at which the sample is imaged is limited by the motion of the stage. In embodiments in which rapid imaging time is important, embodiments in which the specimen is scanned in one direction by moving lens 15 are preferred. Refer now to FIG. 3, which illustrates another embodiment of an imaging system according to the present invention. In imaging system 30, the stage assembly is divided into two components. Component 31 includes focusing lens 55 and is moveable in a direction shown at 32 such that a single line of the image is generated with each pass of component 31. Since focusing lens 55 and mirror 56 have a mass that is small compared to component 57, component 31 can be moved with much greater speed. In one embodiment, component 31 is mounted on a rail and moved in a manner analogous to a print head on an inkjet printer. The second component of the stage assembly is shown at 57. Component 57 includes the mounting mechanism for the specimen being scanned and moves in a direction 33 that is orthogonal to direction 32. Since component 57 only needs to move once per scan line, the slower speed of motion associated with the more massive component 57 is acceptable. In one aspect of the invention, component 57 moves continuously at a speed that is adjusted to that of component 31.

Figure 4:
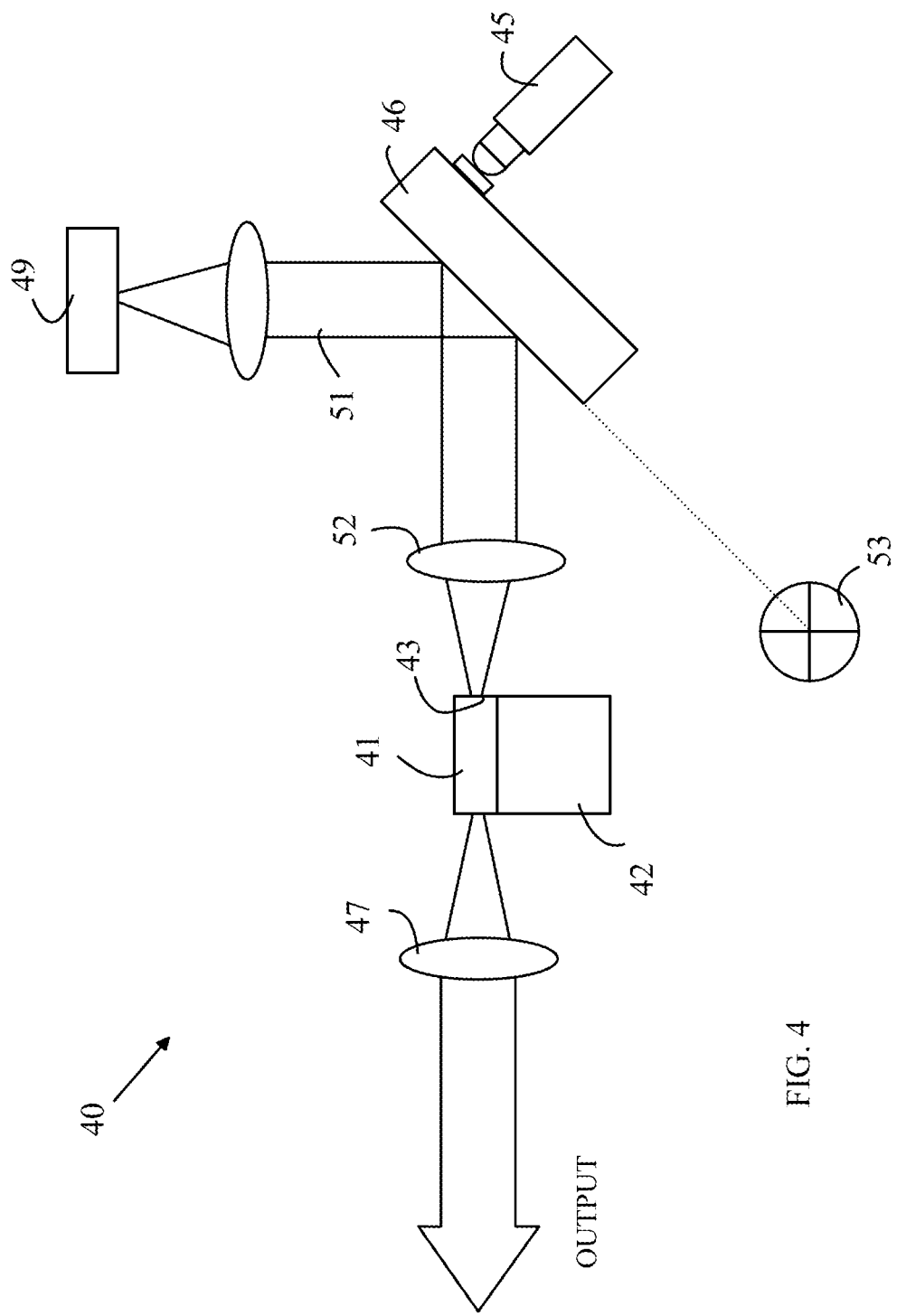
FIG. 4 illustrates a typical quantum cascade laser that uses an external cavity for tuning the laser.

As noted above quantum cascade lasers can be used as the laser source in the present invention. While quantum cascade lasers provide a tunable source with sufficiently high optical power, these lasers suffer from problems in which not all pulses generated by the quantum cascade lasers have the same optical frequency and direction. The manner in which this problem arises can be more easily understood with reference to FIG. 4, which illustrates a typical quantum cascade laser with an external cavity for tuning the laser. Laser 40 includes a gain chip 41 that is mounted on a mount 42. Light from the front facet 43 of gain chip 41 is reflected from a grating 46. The angle of grating 46 relative to the light beam from gain chip 41 is chosen to lock the laser on a particular mode. The angle is set by an actuator 45 that rotates the grating around an axis 53 that is chosen such that the reflected wavelength and the length of the cavity are maintained to provide the desired wavelength. Lens 47 expands the output beam to the desired size to provide the output light that is used by the measurement system that utilizes laser 40 as its light source. Lens 52 expands the light leaving front facet 43 of gain chip 41 to a diameter that is set to provide the desired wavelength resolution from grating 46. Larger beam diameters relative to the spacing of the lines on grating 46 provide narrower wavelength bands in the reflected light that reaches gain chip 41.

In laser 40, an optional light output 51 is used to monitor the light intensity in the output beam using a photodetector 49. Photodetector 49 can be used to provide the signal indicating the output light intensity in place of detector 14 discussed above.

If the band of wavelengths that are reflected back by the grating is sufficiently large, more than one mode of the laser can be excited. In this case, the mode of the output light can hop between modes in an unpredictable pattern over time periods that are less than the time period over which an image is to be generated. The hopping can be induced by any of a number of non-ideal factors such as changes in temperature. In a pulsed laser, the variations in temperature during the pulse can cause such hopping. In addition, pointing errors can be induced in which the angle at which the light leaving the gain chip varies slightly, and hence, the angle of incidence on the grating can change thereby inducing a mode hop.

As a result, different pulses can have slightly different wavelengths and vary slightly in the angle at which the light leaves the quantum cascade laser. If the number of pulses that are averaged for each pixel of the image is sufficiently large, the resulting spectral measurement will be the average of the reflectivity or transmission over the band of wavelengths in the various modes that were included in the output of the laser. In this case, the image will not have artifacts that are the result of mode hopping; however, the spectral measurement will be averaged over a broader band of wavelengths than that present in a single mode. If the mode "content" varies from pixel to pixel, the mode hopping can further introduce noise into the image. Hence, it would be advantageous to reduce the effects of mode hopping in the image.

Typically, there are variations in the energy contained in each pulse. The spread in energies can be greater than 5 percent. The spread in energies often results from pulse trains that have several distinctly different types of pulses that arise because of mode hopping. Within a given type, or family, the energies are substantially the same, but there are significant differences between the energies associated with each family. It is these differences that give rise to the variation in energy referred to above.

In addition, it is also frequently found that each different family of pulses is emitted in a slightly different direction. The variation in "pointing directions" between families can be several milliradians (mrad), typically 1 to 5 mrad. Generally, it is found that all the pulses in a given family are emitted pointing in substantially the same direction.

Accordingly, it would be advantageous to limit the spectral measurements to pulses of the same type. If the pulses from the non-desired modes can be distinguished from the pulses from the desired modes, a spectrum based only on the desired mode can be obtained. In one aspect of the present invention, only pulses that have energies within a predetermined range of energies are used to form the image. In such embodiments, controller 39 measures the pulse amplitude from detector 14 and compares the measured amplitude to maximum and minimum threshold levels. If the measured pulse amplitude is between the threshold levels, the pulse is used in the measurement. If not, controller 19 ignores the results from detector 13.

In another aspect of the invention, detector 14 also measures the direction from which the light entering detector 14 arrives and only utilizes pulses having a direction within a predetermined cone of angles around the desired angle. For example, a collimating plate 14a can be placed in front of detector 14 to reduce the intensity of pulses having pointing errors. Such pulses will appear to have significantly lower intensities, since the collimating plate blocks light that is not aligned with the axis of the collimating plate. Hence, rejecting pulses based on detected intensity also selects against pulses having pointing errors. It should be noted that pointing errors can result in the location of the illumination spot on the specimen moving to an adjacent area from the desired area. Such variations over the measurements lead to a reduction in the spatial resolution of the resulting image in that each pixel can be the result of the averaging of a number of adjacent pixels.

A MIR scanning system according to the present invention can also include a visible light imaging and inspection station. The visible light imaging system provides a number of useful functions. First, the visible light system allows a user to pick a region on a specimen to scan using the MIR scanning system. Second, the dual system can provide a compound image in which the MIR image is superimposed on the visible light image.

Figure 5:
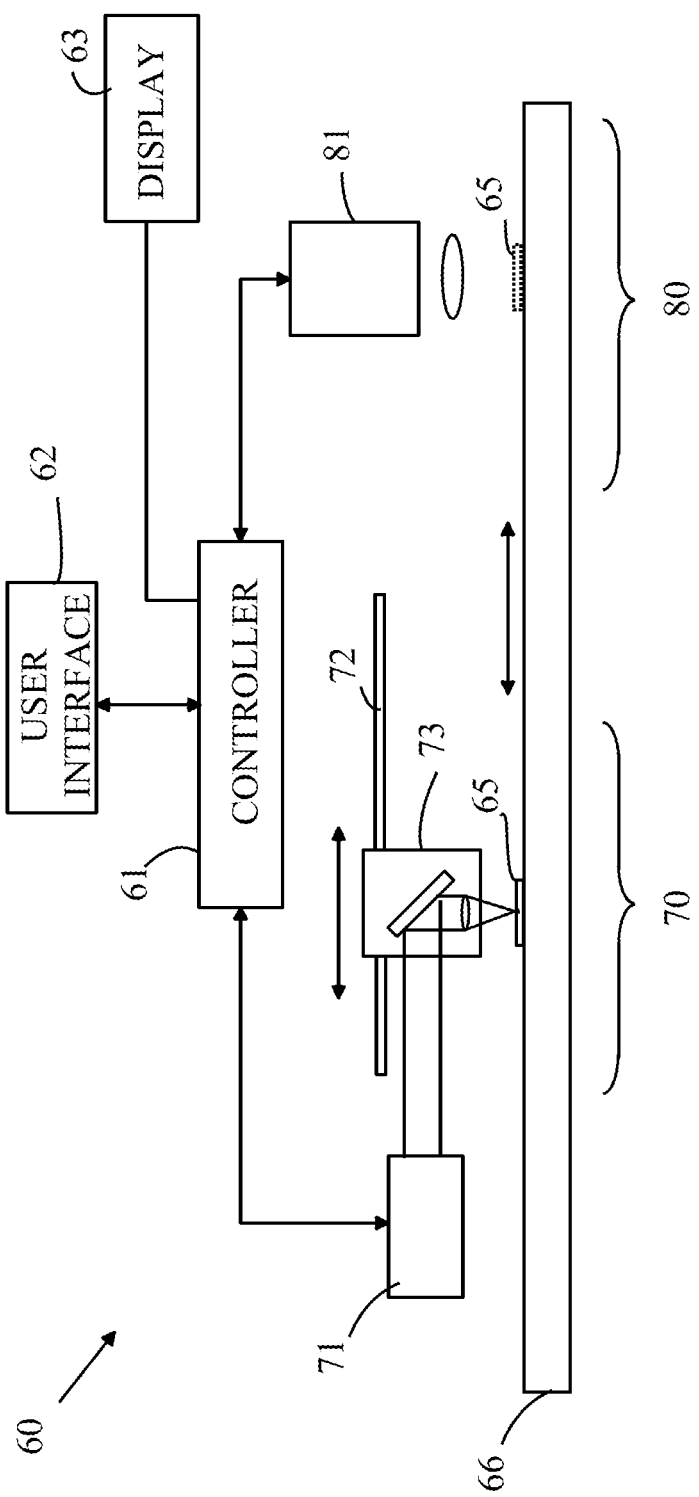
FIG. 5 illustrates another embodiment of a MIR imaging system according to the present invention.

Refer now to FIG. 5, which illustrates another embodiment of a MIR imaging system according to the present invention. Imaging system 60 includes a MIR imaging system 70 and a visible light imaging system 80 having an imaging array 81 that is responsive to light in the visible wavelengths. Both systems are under the control of controller 61. The two imaging systems share a stage 66 that allows a specimen 65 to be moved between the imaging systems such that an area defined using visible light imaging system 80 can be positioned for scanning using MIR imaging system 70. MIR imaging system 70 includes a scanning head 73 that moves on a rail 72 under the control of controller 61 in a manner analogous to that described above with respect to imaging system 30 shown in FIG. 3. Stage 66 allows the specimen to be moved in a direction perpendicular to the direction of travel of scanning head 73 so that a two-dimensional image can be generated. To simplify the drawing, the laser and associated optics in MIR imaging system 70 are shown as a single block 71.

In practice, a user places specimen 65 in position under visible light imaging system 80 and indicates which portion of specimen 65 is to be scanned using a user interface 62 and display 63. The user can indicate the desired area using a point device or similar apparatus. The visible image is generated using an objective lens that provides the desired level of magnification. Controller 61 then computes the distance specimen 65 must be moved to be properly aligned with MIR imaging system 70. Specimen 65 is then moved and scanned as described above. Controller 61 then scales the scanned image to the correct magnification and generates a compound image consisting of the visible light image and the MIR image.

It should be noted that embodiments in which laser 71 and the structure that supports rail 72 move as a unit in the direction orthogonal to the direction of travel of scanning head 73 can also be constructed. The added mass of these components can be accommodated in the orthogonal direction since the required speed of motion is significantly less in this direction.

It should also be noted that the maximum specimen area that can be scanned using the present invention is determined by the maximum range of motion of scanning head 73 and the carriage motion that moves the specimen in a direction orthogonal to the scanning head motion. The size of the focusing lens within scanning head 73 does not depend on this motion. The optimum aperture of the focusing lens is set by the beam diameter from the laser source. Since the laser beam can be focused to a spot that is limited by diffraction, the present invention can provide an image at a resolution that is limited by diffraction. In contrast, a MIR imaging system that relies on an imaging array must either "stitch" sub-images together or use an objective lens that provides pixels that yield an image that has a resolution that is worse than the diffraction limited resolution.

In another aspect of the invention, once a MIR image of a specimen is generated at a particular wavelength, features of interest that are revealed in that image can then be examined spectroscopically. The user can indicate a feature of interest and the present invention will position that feature under the focusing lens and then vary the wavelength to generate a spectrum that can provide further information about the chemical composition of the feature of interest.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising a MIR imaging system comprising:
    a MIR laser that generates a first light beam;
    a stage adapted to carry a specimen to be scanned;
    an optical assembly that focuses said first light beam to a point on said specimen;
    a first light detector that measures a first intensity of light leaving said point on said specimen, wherein said first light detector measures light transmitted by said specimen through said stage, said stage being transparent to said first light beam;
    a controller that forms a MIR image from said first intensity of light,
    wherein said optical assembly comprises a scanning assembly that moves over said specimen in a first direction while scanning said specimen in said first direction, said scanning assembly comprising a mirror and a focusing lens that are fixed relative to one another, said mirror directing light from said first light beam into said focusing lens which focuses said light to said point such that said point remains at a fixed distance from said stage as said scanning assembly moves over said specimen in said first direction, and wherein said MIR laser remains stationary while said scanning assembly moves over said specimen.

2. The apparatus of claim 1 wherein said first light detector measures light reflected from said specimen.

3. The apparatus of claim 1 further comprising a beam intensity detector that measures an intensity of said first light beam.

4. The apparatus of claim 3 wherein said MIR laser is a pulsed light source characterized by a plurality of MIR light pulses, each of said plurality of MIR light pulses being characterized by a beam pulse intensity, and wherein said controller sums measured intensities from said first light detector only for ones of said plurality of MIR light pulses in which said beam pulse intensity is greater than a first threshold.

5. The apparatus of claim 1 wherein said MIR laser is a pulsed light source characterized by a plurality of MIR light pulses, each of said plurality of MIR light pulses being characterized by a beam light pulse intensity and said first light detector generates a plurality of first light detector pulses, each first light detector pulse corresponding to one of said MIR light pulses and being characterized by a first light detector pulse intensity, said controller determining a ratio of said first light detector pulse intensity to said beam light pulse intensity for each beam light pulse having a beam light pulse intensity greater than a first threshold and summing said ratios to form said MIR image.

6. An apparatus comprising a MIR imaging system comprising:
    a MIR laser that generates a first light beam;
    a stage adapted to carry a specimen to be scanned;
    an optical assembly that focuses said first light beam to a point on said specimen;
    a first light detector that measures a first intensity of light leaving said point on said specimen;
    a controller that forms a MIR image from said first intensity of light,
    wherein said optical assembly comprises a scanning assembly that moves over said specimen in a first direction while scanning said specimen in said first direction, said scanning assembly comprising a mirror and a focusing lens that are fixed relative to one another, said mirror directing light from said first light beam into said focusing lens which focuses said light to said point such that said point remains at a fixed distance from said stage as said scanning assembly moves over said specimen in said first direction, and wherein said MIR laser remains stationary while said scanning assembly moves over said specimen, and
    further comprising a separate visible light imaging station that displays a visible image of said specimen generated by illuminating said specimen with light in a visual range of light wavelengths, wherein said separate visible light imaging station comprises an imaging array that is separate from said first light detector, wherein said stage moves said specimen under said separate visible light imaging station to a location that cannot be viewed by said optical assembly.

7. The apparatus of claim 6, wherein said controller is configured to receive input from a user indicating a region in said visible image that is to be scanned by said MIR imaging system to generate a corresponding MIR image, said controller scanning said region in response to said input from said user.

8. The apparatus of claim 7 wherein said MIR laser generates light in a range of wavelengths that is controlled by said controller, said controller measuring light leaving said region at different wavelengths from said region to generate a spectrum characterizing said region.

9. An apparatus comprising a MIR imaging system comprising:
    a pulsed MIR laser that generates a first light beam comprising a plurality of MIR light pulses characterized by different light intensities;
    a stage adapted to carry a specimen to be scanned;
    an optical assembly that focuses said first light beam to a point on said specimen;
    a first light detector that measures a first intensity of light leaving said point on said specimen;
    a stage actuator assembly that causes said specimen to move relative to said point in two dimensions;
    a beam intensity detector that measures an intensity of said first light beam; and a controller that forms a MIR image from said first intensity of light leaving said point on said specimen by summing measured intensities from said first light detector only for ones of said MIR light pulses in which said measured beam intensity is greater than a first threshold.

10. The apparatus of claim 9 wherein each of said plurality of MIR light pulses is characterized by a beam light pulse intensity and said first light detector generates a plurality of first light detector pulses, each of said plurality of first light detector pulses corresponding to a corresponding one of said plurality of MIR light pulses and being characterized by a first light detector pulse intensity, wherein said controller determines a ratio of said first light detector pulse intensity to said beam light pulse intensity corresponding to that first light detector pulse and sums said ratios for all first light detector pulses for which corresponding beam light pulse intensity is greater than a threshold that is greater than zero to form said MIR image.

11. The apparatus of claim 9 wherein MIR light pulses are emitted in a plurality of different directions from said pulsed MIR laser, and wherein said beam intensity detector comprises a directional attenuator that blocks MIR light pulses from said MIR pulsed laser that are not traveling in a predetermined direction from reaching said beam intensity detector.

* * * * *